United States Patent
Salamon

(10) Patent No.: US 7,214,724 B2
(45) Date of Patent: May 8, 2007

(54) METHOD FOR CROSS-LINKING A FOAMABLE PLASTIC

(75) Inventor: Marcel Salamon, Porta-Westfalica (DE)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 358 days.

(21) Appl. No.: 10/868,060

(22) Filed: Jun. 15, 2004

(65) Prior Publication Data

US 2005/0239914 A1    Oct. 27, 2005

Related U.S. Application Data

(63) Continuation of application No. PCT/DE02/04589, filed on Dec. 14, 2002.

(30) Foreign Application Priority Data

Dec. 17, 2001 (DE) .................... 101 61 916

(51) Int. Cl.
C08J 9/00 (2006.01)
C08J 9/06 (2006.01)
C08J 9/12 (2006.01)
C08F 2/46 (2006.01)

(52) U.S. Cl. .............. 521/50.5; 521/50; 521/53; 521/142; 521/148; 521/149; 521/150; 521/915; 521/918; 522/2; 522/3; 522/5; 522/104; 522/108; 522/109; 522/110; 522/111; 522/112; 522/150; 522/153; 522/154; 522/155; 522/157; 522/158; 522/159; 522/162

(58) Field of Classification Search ............... 521/50.5, 521/53, 142, 148, 149, 150, 915, 918; 522/2, 522/3, 5, 104, 108, 109, 110, 111, 112, 150, 522/153, 154, 155, 157, 158, 159, 162
See application file for complete search history.

(56) References Cited

U.S. PATENT DOCUMENTS

| 5,496,863 | A | * | 3/1996 | Kitagawa et al. .......... 521/50.5 |
| 5,859,076 | A | * | 1/1999 | Kozma et al. ................ 521/79 |
| 5,931,474 | A | | 8/1999 | Chang et al. |
| 5,979,902 | A | | 11/1999 | Chang et al. |
| 6,107,574 | A | | 8/2000 | Chang et al. |
| 6,114,004 | A | | 9/2000 | Cydzik et al. |
| 6,124,370 | A | | 9/2000 | Walton et al. |
| 6,562,878 | B2 | | 5/2003 | Blank et al. |

FOREIGN PATENT DOCUMENTS

| DE | 100 57 583 A1 | 6/2002 |
| FR | 1 499 714 | 10/1967 |
| GB | 1 092 225 | 11/1967 |
| JP | 52-014671 | 2/1977 |

OTHER PUBLICATIONS

Database WPI, Section Ch, Week 197711, Derwent Publications Ltd., London, GB; Class A17, AN 1977-19052Y XP002251387 of JP52 014671 (1977).

* cited by examiner

*Primary Examiner*—Sanza L. McClendon
(74) *Attorney, Agent, or Firm*—Woodcock Washburn LLP

(57) ABSTRACT

A plastic is converted from an initial condition with a higher density into a foamed condition with a lower density using a blowing agent, wherein the plastic is cross-linked prior to foaming by means of a first cross-linking agent and during the foaming by means of at least one second cross-linking agent.

30 Claims, 3 Drawing Sheets

METHOD FOR CROSS-LINKING A FOAMABLE PLASTIC

CROSS-REFERENCE TO RELATED APPLICATIONS

This application is a continuation under 35 USC Sections 365(c) and 120 of International Application No. PCT/DE02/04589, filed 14 Dec. 2002 and published 26 Jun. 2003 as WO 03/051601, which claims priority from German Application No. 10161916.2, filed 17 Dec. 2001, each of which is incorporated herein by reference in its entirety.

FIELD OF THE INVENTION

This invention relates to a process for treating a foamable plastic, in which the plastic is converted from a relatively high density starting condition into a relatively low density foamed state by a blowing agent in a foaming process, and to a plastic treated by this process.

DISCUSSION OF THE RELATED ART

Conventional foamable plastics generally consist of a basic polymer, a blowing agent and additives. If the plastic is melted, the blowing agent is activated by the heat applied and the plastic foams. Examples of the other additives include dyes and plasticizers which give the foamed plastic the required color and the required plasticity, respectively.

One disadvantage of these foamable plastics is that they sag under the effect of gravity during the foaming process, with the result that foaming is not isotropic. Any structure or shape given to the plastic before foaming is generally lost because the melt is not sufficiently "stabilized".

Accordingly, the problem addressed by the invention was to avoid or reduce this problem.

SUMMARY OF THE INVENTION

According to the invention, the problem stated above is solved by a plastic which is cross-linked before foaming by at least a first cross-linking agent and during foaming by at least a second cross-linking agent.

BRIEF DESCRIPTION OF THE DRAWINGS

Various embodiments of the process according to the invention are described in detail in the following with reference to the accompanying drawings, wherein.

DETAILED DESCRIPTION OF CERTAIN EMBODIMENTS OF THE INVENTION

Figure 1:
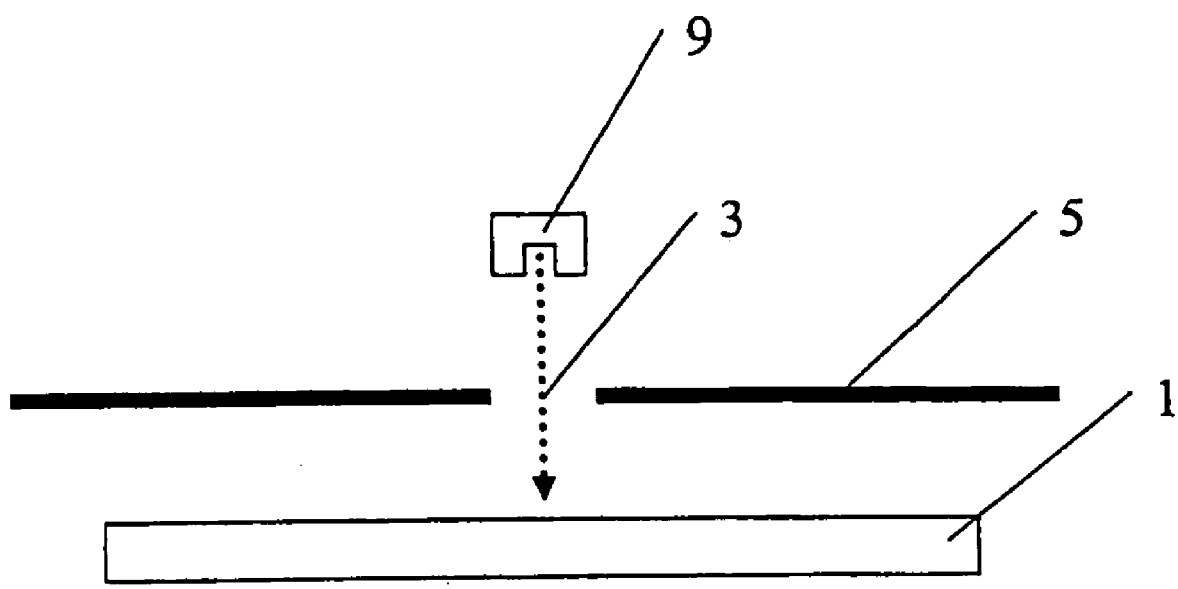
FIG. 1 is a side elevation of an arrangement for irradiating a plastic part.

In the process according to the invention, a foamable plastic is cross-linked by a first cross-linking agent before foaming and by a second cross-linking agent during foaming.

During the foaming process, an uncross-linked plastic largely loses the shape or structure which the molding formed from the foam had. This is due on the one hand to the major structural changes the plastic undergoes during the foaming process and, on the other hand, to gravity under whose influence the foam sags, particularly during cooling in or after the foaming process. In order to maintain shape or structure during the foaming process, the plastic has to be cross-linked.

By using a cross-linking agent, polymer chains in the plastic are locally destroyed and radicals are formed in the plastic. The free ends of the polymer chains and the free radicals enter into new bonds with one another so that the polymers are partially cross-linked. If a plastic pretreated in this way is heated beyond its melting point, the firm structure of the plastic softens, resulting in the formation of a "stabilized material" which has a higher viscosity than a melt. The higher viscosity is attributable to the partial pre-cross-linking of the plastic and results in the stabilized material having a certain dimensional stability. If, now, the foaming process is initiated, for example by a heat-activatable blowing agent, the foam formed from the stabilized material largely has the shape or structure of the basic molding. During the foaming process, however, the foamed material again loses a little of the shape or structure of the basic molding for the reasons explained above. Accordingly, this has to be restored by a second cross-linking agent that is activated during the foaming process. Under the effect of the second cross-linking agent, the polymer chains in the plastic are further cross-linked to obtain the foamed shape of the plastic.

The foam formed in this way largely has the shape of the basic molding, generally shows more volume through nucleation and has finer cells.

Physical and chemical cross-linking agents may be used.

The physical cross-linking agent may be, in particular, high-energy radiation that, preferably, penetrates through the entire plastic. The energy of the radiation should be selected so that the mean free path length of the radiation in the plastic is greater than the thickness of the plastic in the direction of incidence of the radiation. Electron beam radiation, more particularly with an energy dose between 100 keV and 10 MeV, is preferably used, although proton radiation may also be used. Given sufficiently high densities, atomic rays or light atomic nuclei may also be used for irradiation. Gamma radiation or X-radiation is also suitable.

Peroxides, particularly organic peroxides, may be used as the chemical cross-linking agent. They are incorporated in the plastic, for example in the molten state, before the formation of a molding from the melt. Through the radical decomposition of the peroxide, the plastic is partly cross-linked and a partly cross-linked molding is formed. This molding is then placed in an arrangement and foamed. In addition, there are chemical cross-linking agents that can be activated during the foaming process and partly cross-link the foam formed.

In a first embodiment of the process according to the invention (FIG. 1), a foamable plastic 1, more particularly in the form of an injection molding, is exposed before foaming to high-energy radiation 3 from a radiation source 9 through a slot diaphragm 5. The plastic molding thus pretreated is placed, for example, in the bodywork of an automobile in order to seal off voids in the bodywork.

If the melting point of the plastic is reached during heating of the molding, for example in a drying oven for drying the paint applied to the automobile, the stabilized material is formed through the physical pre-cross-linking. The heat-activatable blowing agent is preferably also activated at that temperature, so that the foaming process is initiated. During the foaming process, the second chemical cross-linking agent is activated in order further to cross-link the polymer chains of the plastic. The second cross-linking agent may also be activatable at the activation temperature of the blowing agent or at a higher temperature. The latter is particularly advantageous when the plastic used is heat-curable so that the plastic is heated during foaming to temperatures well above the melting point of the plastic.

The properties of the stabilized material may largely be controlled through the applied energy dose to which the plastic is exposed. If the energy dose is too low, not enough new cross-linking points are generated, so that the desired effect is not obtained. If the energy doses are too high, cross-linking is so dense that the material is very highly stabilized, resulting in a considerable reduction in foamability. If, however, an energy dose between these two extremes is used, the material is sufficiently stabilized to retain the structure of the molding, even in the heated state, and at the same time to retain satisfactory foamability of the material.

The energy dose actually required depends on the basic polymer, the blowing agent and the additives used, such as for example chemical cross-linking agents, stabilizers, kickers and inhibitors. Where an ethylene/vinyl acetate (EVA) is used as the basic polymer and azodicarbonamide as the blowing agent, the desired effect is obtained in the energy dose range from 1 to 10 KGy and more particularly in the range from 3 to 6 KGy.

The basic polymer of the plastic used in the present embodiment is ethylene/vinyl acetate, the vinyl ,acetate making up 5 to 25% by weight of the EVA. The blowing agent used is azodicarbonamide which is activated by heat in the melt. In a preferred embodiment, the blowing agent is introduced into, the plastic before irradiation, although it may also be introduced after irradiation.

Figure 2:
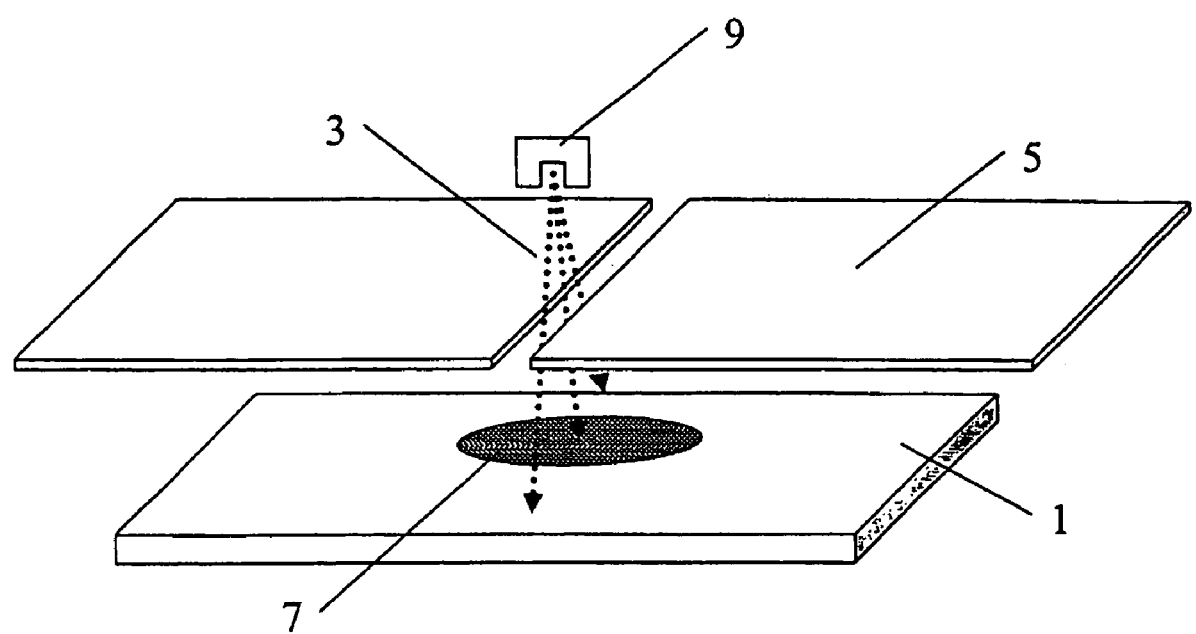
FIG. 2 is a perspective view of an arrangement for irradiating a plastic part through a mask.

As shown in FIG. 2, sections of the plastic can be shielded from the radiation 3 by a mask 7. If the energy dose is selected so that those parts of the plastic 1 that are not shielded by a mask receive a mean energy dose according to the invention, the molding formed is cross-linked in sections. If the foaming process is initiated, the irradiated part of the plastic foams substantially isotropically whereas the foaming process of the non-irradiated part of the plastic is influenced by gravity. In this way, the foaming of the molding can be influenced or controlled as required.

In a variant, the mask is partly permeable to the radiation. If, now, the molding is exposed to a high energy dose, that part of the plastic which was exposed to a high energy dose is highly cross-linked. That part of the plastic which was partly protected from the radiation by the mask only absorbs a mean energy dose. During the foaming process, the regions, which have absorbed a mean energy dose foam isotropically whereas the foaming process in the regions which have absorbed a high energy dose is more or less seriously inhibited. The latter regions may be used in particular as holding elements for a plastic molding in an arrangement because they still have a certain stability, even in the heated state.

In a variant, a holding element is present as a separate element of the same plastic as, or another material than, the irradiated plastic part and is fixed thereto in order to hold it by means of the holding element, for example in a void to be sealed with the plastic to be foamed, more particularly in the body of a motor vehicle.

If the irradiated plastic is made from an intermediate, for example raw material, powder or granules, the intermediate used to produce a part or molding may be irradiated instead of the part or molding itself.

If a plastic molding is combined with other moldings, more particularly of plastic, to form a composite part, this plastic composite may be exposed to the radiation either as a whole or only locally.

In addition, one or more plastic parts (moldings) may be irradiated before being combined with other components to form a plastic composite.

In a second embodiment of the process according to the invention, an organic peroxide is incorporated in a melt of a foamable plastic so that the plastic is partly cross-linked. However, this partial cross-linking is so limited that the molding subsequently extruded from the melt is adequately cross-linked with high-energy radiation before the foaming process. In this way, the molding subsequently incorporated forms an adequately stabilized material on heating.

As a result of the chemical and physical cross-linking, the stabilized material is initially formed during heating of the molding. The blowing agent is preferably activated at that temperature and foams the stabilized material. The chemical cross-linking agent is re-activated during the foaming process which leads to further cross-linking and local solidification of the foam.

Figure 3:
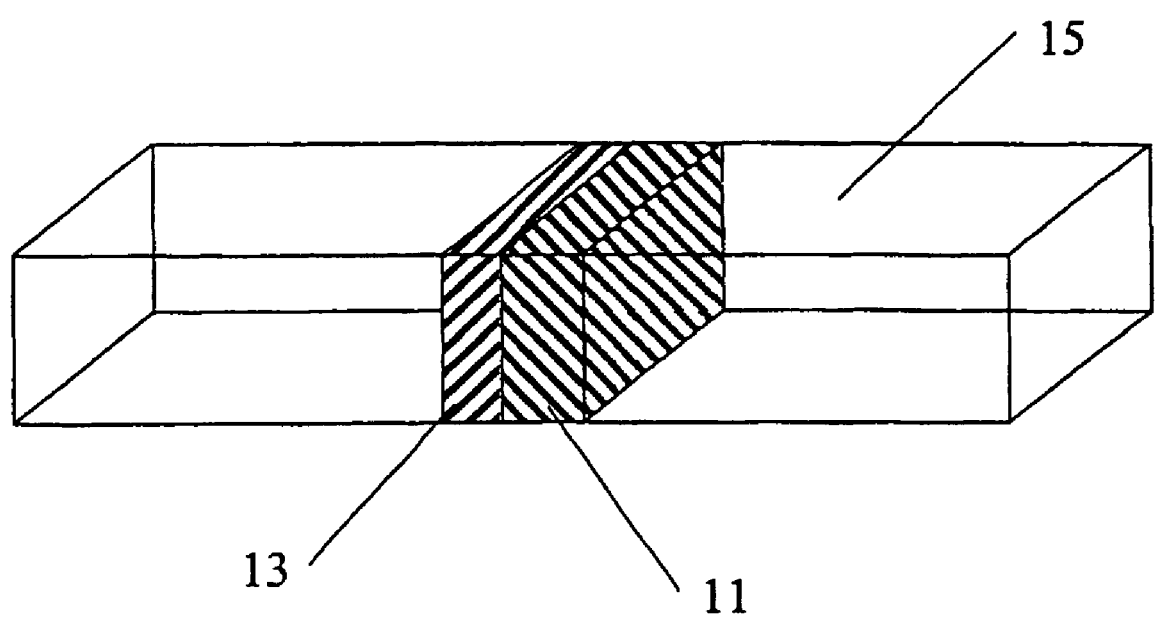
FIG. 3 is a perspective view of a plastic molding treated by the process according to the invention that is mounted by means of a molding in the chassis of an automobile.

In a third embodiment, both the first and the second cross-linking agent are chemical. The first cross-linking agent is activated at a temperature which is lower than that at which the second cross-linking agent is activated. If both cross-linking agents are added to a melt of the plastic, only the first cross-linking agent is activated through suitable temperature control, so that the melt is partly cross-linked. In a following step, a molding 11 shown in FIG. 3 is extruded from the melt and is combined with another molding 13, more particularly of a harder plastic. The plastic composite thus formed is used, for example, in a section of the chassis 15 of an automobile. The foamable plastic forming the molding 11 is then melted in a drying oven, so that the blowing agent is activated. The temperature in the drying oven is so high that the second chemical cross-linking agent is also activated and partly cross-links the foam formed. The melt is prevented from flowing to a side wall of the chassis section 15 by the cross-linking and the foam completely fills the cross-section of the chassis section. A composite material is thus formed from the foam and the steel of the chassis section 15, so that the chassis is additionally stabilized in this region and the void is reliably sealed.

In every embodiment of the process, the blowing agent for the plastic and/or other additives may be introduced into the plastic before, during or even after the first cross-linking step.

What is claimed is:

1. A process for foaming a plastic wherein the plastic is converted to a foamed state by a blowing agent in a foaming process, comprising cross-linking the plastic before foaming by a first cross-linking agent, wherein, when the first cross-linking agent is high-energy radiation, it penetrates through the entire plastic; and cross-linking the plastic during foaming by a second cross-linking agent.

2. A process as claimed in claim 1, wherein the first cross-linking agent is a physical cross-linking agent.

3. A process as claimed in claim 1, wherein the second cross-linking agent is a physical cross-linking agent.

4. A process as claimed in claim 1, wherein the first cross-linking agent is a chemical cross-linking agent.

5. A process as claimed in claim 1, wherein the second cross-linking agent is a chemical cross-linking agent.

6. A process as claimed in claim 2, wherein high-energy radiation is used as the physical cross-linking agent.

7. A process as claimed in claim 6, wherein said high-energy radiation is selected from the group consisting of electron beam radiation, β-radiation, proton radiation, atomic radiation, light atomic nuclei, and combinations thereof.

8. A process as claimed in claim 6, wherein said high-energy radiation is selected from the group consisting of X-radiation and gamma radiation.

9. A process as claimed in claim 6, wherein said high-energy radiation is applied from at least two directions.

10. A process as claimed in claim 6, wherein an energy dose of 1 to 10 kGy is applied to the plastic by the high-energy radiation.

11. A process for foaming a plastic in the presence of a blowing agent, comprising:
    cross-linking the plastic before foaming by exposure to high-energy radiation; and
    cross-linking the plastic during foaming by exposure to a second cross-linking agent; wherein said plastic is locally exposed to different energy doses.

12. A process as claimed in claim 6, wherein a mask is used for irradiating one or more selected parts of the plastic.

13. A process as claimed in claim 4, wherein one or more peroxides are used as the chemical cross-linking agent.

14. A process as claimed in claim 1, wherein the plastic is in a form selected from powder, granules, a melt, a plastic part, a plastic molding, or a plastic composite when cross-linked by said first cross-linking agent.

15. A process as claimed in claim 1, wherein said plastic is comprised of an ethylene/vinyl acetate (EVA) polymer.

16. A process as claimed in claim 1, wherein the plastic prior to foaming comprises at least one heat-activatable blowing agent.

17. A process as claimed in claim 1, wherein the plastic prior to foaming comprises azodicarbonamide.

18. A process as claimed in claim 1, wherein said plastic is in the form of a plastic part and wherein said the plastic part comprises at least one holding element by which the plastic part can be held in an arrangement before the foaming process.

19. A process as claimed in claim 18, wherein at least one holding element is formed by exposing a region of the plastic part to a high energy dose to obtain high stabilization of said region.

20. A process as claimed in claim 3, wherein high-energy radiation is used as the physical cross-linking agent.

21. A process as claimed in claim 20, wherein said high-energy radiation is selected from the group consisting of electron beam radiation, β-radiation, proton radiation, atomic radiation, light atomic nuclei, and combinations thereof.

22. A process as claimed in claim 20, wherein said high-energy radiation is selected from the group consisting of X-radiation, gamma radiation and combinations thereof.

23. A process as claimed in claim 20, wherein said high-energy radiation is applied from at least two directions.

24. A process as claimed in claim 20, wherein an energy dose of 1 to 10 kGy is applied to the plastic by the high-energy radiation.

25. A process as claimed in claim 20, wherein said plastic is locally exposed to different energy doses.

26. A process as claimed in claim 20, wherein a mask is used for irradiating one or more selected parts of the plastic.

27. A process as claimed in claim 1, wherein the first cross-linking agent is a physical cross-linking agent and the second cross-linking agent is a chemical cross-linking agent.

28. A process as claimed in claim 1, wherein the first cross-linking agent is a chemical cross-linking agent and the second cross-linking agent is a physical cross-linking agent.

29. A process as claimed in claim 1, wherein both the first cross-linking agent and the second cross-linking agent are chemical cross-linking agents.

30. A process as claimed in claim 1, wherein both the first cross-linking agent and the second cross-linking agent are physical cross-linking agents.

* * * * *